April 17, 1934.     R. W. JUDD     1,955,189
SAFETY DEVICE FOR BELTS AND THE LIKE
Filed Aug. 13, 1932

Roy W. Judd, INVENTOR.

BY [signature]
ATTORNEYS.

Patented Apr. 17, 1934

1,955,189

UNITED STATES PATENT OFFICE 1,955,189

SAFETY DEVICE FOR BELTS AND THE LIKE

Roy W. Judd, Baldwin Park, Calif.

Application August 13, 1932, Serial No. 628,709

4 Claims. (Cl. 192—116.5)

My invention relates to safety devices for belts and the like, its object being to prevent damage to the belt in case it creeps laterally on its pulleys or drums. When such creepage occurs, the belt is liable to drag against the bearing pedestals for the pulleys, or against some other member, and become frayed or worn. Moreover, when the belt creeps so far as to overhang its pulleys it loses part of its driving power and is subjected to excessive stresses. In some installations where large and expensive belts are employed, the damage thus wrought adds materially to the overhead costs of operation. I have, therefore, provided means, controlled by the belt itself, for automatically stopping the latter when it creeps excessively in either edgewise direction, irrespective of the direction of rotation of the driving pulley or the travel of the belt.

The invention may be embodied in various forms, depending upon the type of prime mover employed, the position of the belt with reference to the prime mover, and upon other factors. In the accompanying drawing I have illustrated the same as applied to an internal combustion motor or engine and also to a steam engine. Therefore, the accompanying claims are not intended to be limited to any particular embodiment of the invention unless they be confined thereto by their express terms.

Figure 1:
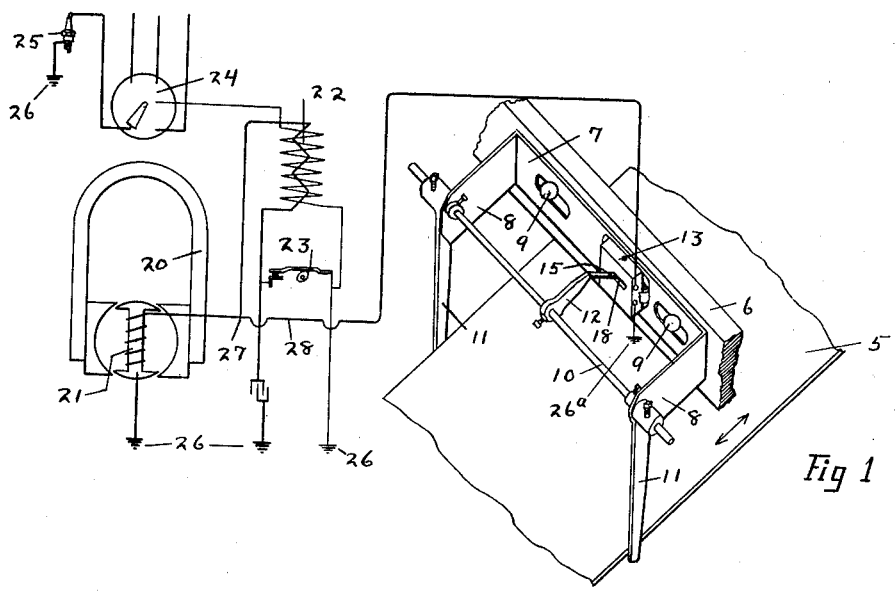
Figure 2:
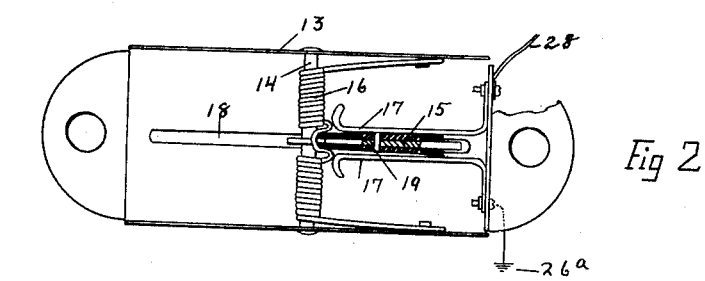
Figure 3:
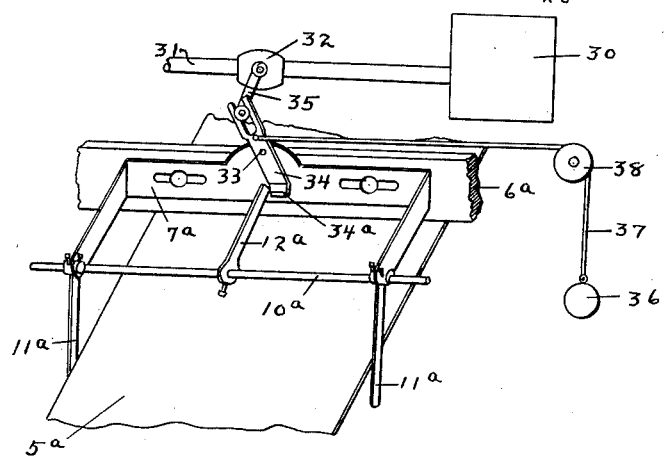

In the drawing, Fig. 1 is a diagrammatic view, partly isometric, showing the invention applied to a belt which is driven by an internal combustion engine; Fig. 2 is an enlarged rear elevation of an electric switch, shown in closed position, the same switch appearing in Fig. 1 in its normal open position; and Fig. 3 is a view similar to Fig. 1, but showing the invention applied to a steam engine.

In Fig. 1, a portion of a belt, conveyor or the like is shown at 5. It will, of course, be understood that the belt is continuous or endless and is passed about pulleys or drums, not shown. Attached to a suitable support, indicated at 6, is a frame member 7 having arms 8 extending therefrom in parallel relation at its ends. The frame member is secured to its support in any suitable manner, as by bolts 9 which extend through slots in the said member, the slots permitting the member to be adjusted in position. Journaled in the forward ends of the arms 8 is a rock-shaft 10, the same extending at each of its ends beyond the respective arms. Rigidly secured to the rock-shaft is a pair of spaced trip-fingers 11, the same extending across the plane of the belt adjacent the edges of the latter and in position to be engaged by the belt if it should creep excessively in either direction. By setting the fingers outwardly more or less from the edges of the belt, the extent of permissible creeping action may be varied. The fingers are secured to the shaft in any suitable manner, as by the set-screws shown. The fingers may be set at any angle to the run of the belt so long as they are in position to be engaged thereby when the belt creeps far enough to take up the clearance provided. As shown, the belt run is approximately horizontal and the fingers approximately vertical. The belt may, of course, extend at any angle and may travel in either direction, as indicated by the double-barbed arrow.

Secured to the rock-shaft 10 is a detent 12 which is set to project toward and to control a switch 13 which is stationarily mounted on any suitable support, preferably on the frame member 7, as shown. The detent is adapted to be set at any angle on the shaft, depending upon the position of the switch. This switch may be of any suitable type, that shown comprising a casing across which extends a pin 14, upon which is pivoted the movable member or blade 15 of the switch. Coiled upon the pin is a spring 16 which is tensioned to close the blade between a pair of stationary contact plates 17, as shown in Fig. 2. The front of the casing is slotted at 18, and the pivoted blade 15 is projected outwardly through this slot in position to engage the detent 12, as shown in Fig. 1. When in this position, the switch is open; but when the detent is moved, as the shaft 10 is rocked in either direction, the blade is released and is swung by the spring 16 into position between the contact plates 17. As shown in Fig. 2, in which a part of the blade is shown as broken out, the blade is provided on both of its sides with insulation, and a contact pin 19 extends transversely through the plate and insulation to contact with the plates 17 when the switch is closed. When in this position an electrical connection is established between said plates, the current flowing through the pin 19. This current is adapted, through suitable instrumentalities, to cause the belt to stop.

At the left of Fig. 1 is a diagrammatical showing of an ignition circuit for an internal combustion motor or engine, the same employing a magneto having the field-magnets 20 and armature 21. The ignition circuit shown is conventional and well understood, and it is deemed sufficient to state merely that the induction coil or transformer is indicated at 22, the breaker at 23, the distributer at 24 and a spark-plug at 25, suitable grounds being provided at 26, one of these grounds being connected to one of the plates 17 of the switch 13, as indicated at 26a. There will be as many spark-plugs as there are cylinders in the engine and the plug shown may be considered as representing the engine.

Leading out from a point 27 in the primary of the ignition circuit is a conductor 28 which leads to the other of the plates 17 of the switch 13. When the switch is held open by the engagement of its blade 15 with the detent 12 the circuit through the switch is broken and the ignition circuit functions in the conventional manner to cause the engine to operate and drive the belt 5. When, however, the belt creeps in either direction into contact with a trip-finger 11, the switch-blade is released, the switch is closed and a ground is established which shunts out or short-circuits the induction coil and thus prevents sparking at the spark-plugs. As a consequence, the engine stops as does also the belt, and damage to the latter is prevented. As those skilled in the art will clearly understand, the same result may be attained by having the switch in the secondary circuit of the transformer rather than in the primary circuit, as shown. It will further be understood that a battery ignition circuit may be substituted for the magneto circuit if preferred, it being necessary only to ground the primary or the secondary circuit of the transformer.

In Fig. 3, I have shown my invention so applied as to be adapted to stop a steam engine if used as the prime mover for the belt. In this figure the belt is indicated at 5a, the support at 6a, the frame member at 7a, the rock-shaft at 10a, the trip-fingers at 11a, and the detent at 12a. A steam engine is indicated by the rectangle 30, steam for which is supplied through a pipe 31 in which there is a cut-off valve, the casing of which is designated 32. Pivoted at a stationary point 33 on a suitable support, as the frame 7a, is a lever 34, the same having a yoke at one end within which extends the free end of a crank arm 35 which is connected with the stem of the valve to rock the latter and thus turn off or on the steam. The end of the lever 34 opposite the yoke is turned outwardly at 34a to engage with the detent 12a, being impelled toward the latter by any suitable means, as by a weight 36 which is connected by a rope 37, or other suitable flexible connection, with the lever. As shown, the rope passes over a stationary pulley 38. From this description it will be clear that when the detent is moved either up or down by contact of the belt with either trip-finger, the weight will swing the lever 34 and turn the valve to shut off the steam to the engine, thus stopping the belt.

The control mechanism of Fig. 3 may be used to stop a belt driven through other means. Thus, the lever 34 may cut off the fuel to a Diesel engine or it may control a gate valve in a water supply for a turbine which drives the belt to shut off or divert the water from the turbine when the belt creeps, or the lever 34 may be a yoke for throwing a clutch through which the belt is driven.

I claim:

1. A device of the character described comprising a belt and means for driving the same, a movable member, means impelling said member to a movement in one direction, a detent for normally holding said member against such movement, a movable shaft to which said detent is secured, a pair of trip-fingers on said shaft and extending across the plane of said belt to engage the edges of the belt when it creeps from its normal running position, whereby the belt shifts said shaft and moves the detent to release the said movable member, and means controlled by the movable member for causing said belt to stop when the member is released by the detent and is moved by its impelling means.

2. A device of the character described comprising a belt, an internal combustion engine for driving said belt, said engine being provided with a cylinder and an ignition system for producing sparks to ignite the fuel in the engine cylinder, a frame, a movable shaft journaled on said frame, a pair of trip-fingers projecting from said movable shaft at opposite edges of the belt in position to be engaged by the belt when it creeps from its normal running position, a grounded electric circuit normally open but connected with the ignition circuit, and means under control of the said movable shaft for closing said grounded circuit when the belt engages one of said trip-fingers, where the ignition circuit is grounded and is rendered incapable of producing sparks so that the engine and the belt stop.

3. A device as set forth in claim 2 in which the trip-fingers on the shaft are adjustable to accommodate belts of different widths and to provide any desired clearance between the fingers and the edges of the belt.

4. A device of the character described comprising a belt, an internal combustion engine for driving said belt, said engine being provided with a cylinder and an ignition system for producing sparks to ignite the fuel in the engine cylinder, a frame, a pair of arms projecting from said frame, a movable shaft journaled in said arms, a pair of trip-fingers projecting from said movable shaft at opposite edges of the belt in position to be engaged by the belt when it creeps from its normal running position, a grounded electric circuit connected with the ignition circuit, an electric switch in said grounded circuit, said switch having a blade for closing the circuit through said switch, means impelling said blade to movement in a direction for closing the grounded circuit, a detent rigidly but adjustably connected with said movable shaft, said detent being adapted to engage said switch blade and hold the switch open while the belt is running in its normal position, the construction and arrangement being such that when the belt creeps into engagement with one of the trip-fingers the shaft is shifted and the detent is moved to release the switch blade and permit it to be moved by its impelling means, whereby the switch is closed and the ignition circuit is grounded.

ROY W. JUDD.